A. COLEMAN.
STEERING MECHANISM.
APPLICATION FILED JULY 24, 1917. RENEWED APR. 22, 1919.
1,308,890.
Patented July 8, 1919.
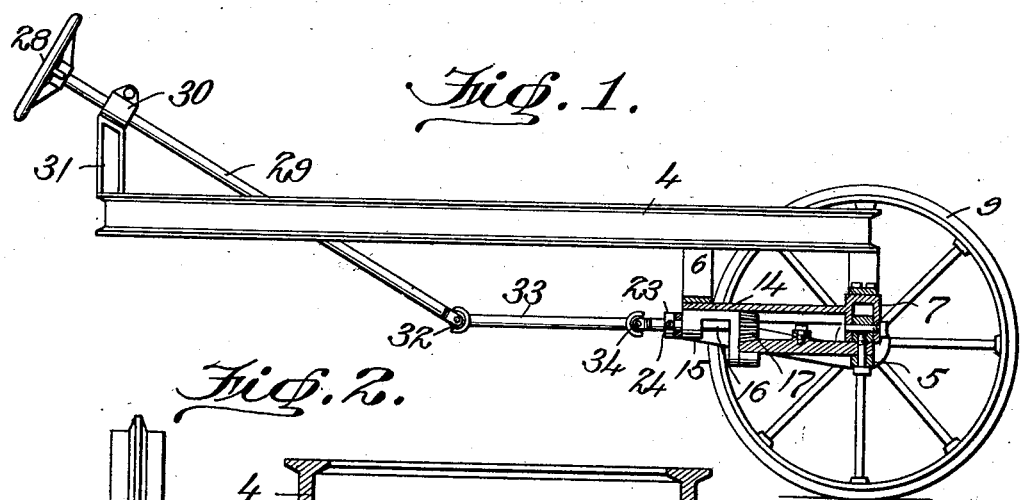
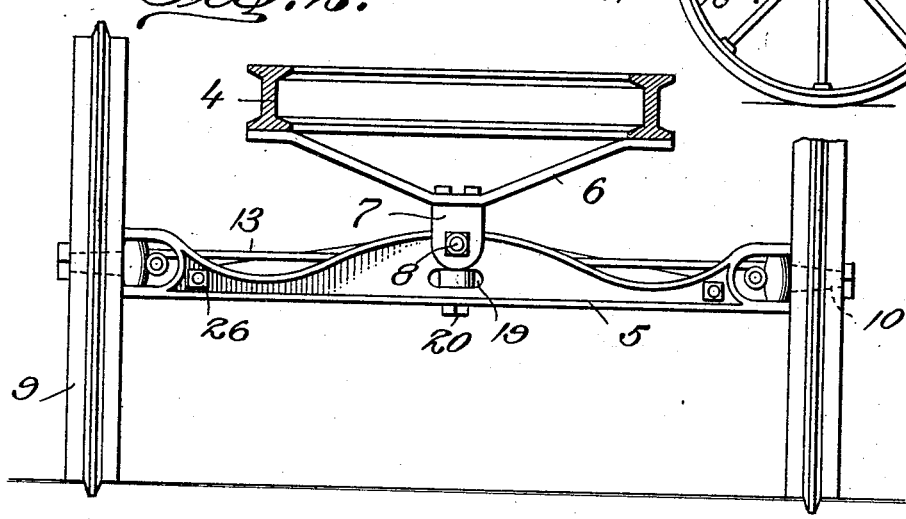
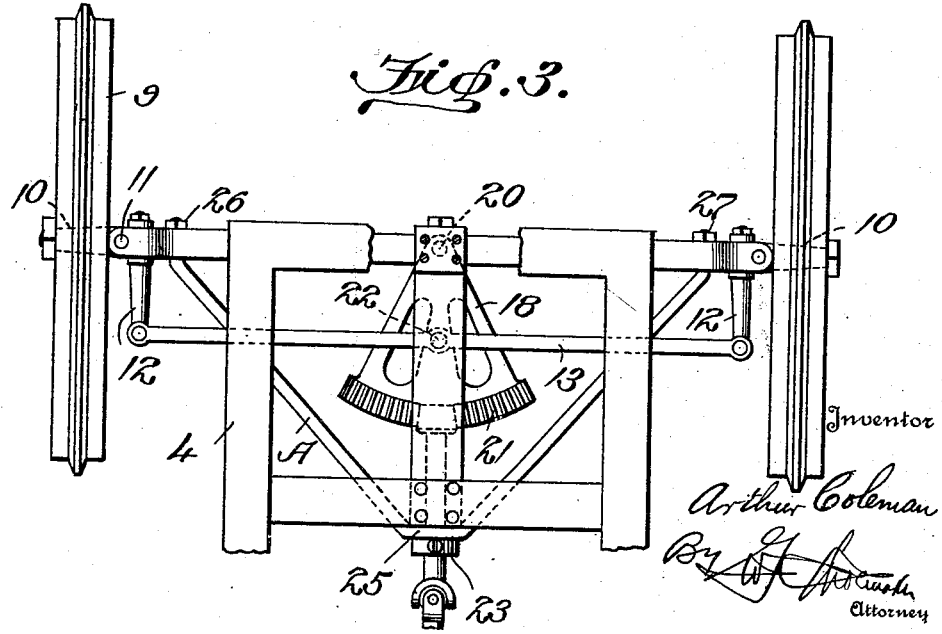

UNITED STATES PATENT OFFICE.

ARTHUR COLEMAN, OF KANSAS CITY, MISSOURI.

STEERING MECHANISM.

1,308,890.   Specification of Letters Patent.   Patented July 8, 1919.

Application filed July 24, 1917, Serial No. 182,530. Renewed April 22, 1919. Serial No. 291,951.

*To all whom it may concern:*

Be it known that I, ARTHUR COLEMAN, a citizen of the United States, residing at Kansas City, in the county of Jackson and State of Missouri, have invented certain new and useful Improvements in Steering Mechanisms, of which the following is a specification.

This invention relates to steering mechanism for motor driven or other vehicles.

One object of the invention is to provide a steering mechanism particularly adapted for tractors, but equally as well applicable to other types of motor driven vehicles, and embodies, among other characteristics, a simple organization of parts constructed and arranged to provide for a short turn of the vehicle.

Another object resides in the provision of a simple, strong, durable, economical and efficient steering mechanism for tractors or other motor driven vehicles.

With the above and other objects in view, the invention consists in the novel construction, combination and arrangement of parts hereinafter fully described, illustrated in the accompanying drawings, and pointed out in the claims hereto appended, it being understood that various changes in the form, proportion and minor details of construction within the scope of the claims may be resorted to without departing from the spirit or sacrificing any of the advantages of the invention.

In the drawings:—

Figure 1 is a side elevation of a portion of a tractor or other motor driven vehicle chassis frame illustrating my invention partly in section.

Fig. 2 is a front view showing the chassis frame in section.

Fig. 3 is a top plan view, parts being broken away.

As the invention in this case relates to steering devices for tractors, automobiles, or other motor driven vehicles, there has been illustrated just sufficient structure as will illustrate the steering mechanism and its application to any character of motor driven vehicle. To this end, the character 4 indicates a chassis frame supported upon the front axle 5 by a bolster 6 connected to the chassis or frame in any suitable manner and to the axle by means of a suitable clip 7, which is preferably of inverted U-shape in cross section and which is connected to the axle by means of a bolt 8.

The front wheels 9 are supported on the spindles 10 of the knuckle joints 11 pivotally connected to the front axle in the usual manner and which joints include the arms 12 connected together by the connecting rod 13.

Formed with or connected to the clip 7 is a rearwardly directed arm 14 to which is connected a bracket 15 in which is journaled a short shaft 16 on the inner end of which is secured a beveled pinion 17.

A segment 18 has its minor end pivotally mounted in a slot 19 in the axle 5 by means of a pivot bolt 20. This segment 18 has a segmental rack 21 at its major end adapted to mesh with the aforesaid beveled pinion 17, the teeth of the rack being beveled or otherwise formed for efficient co-action with said beveled pinion. A bolt 22 pivotally connects the segment 18 to the connecting rod 13 and the beveled pinion 17 is held in proper mesh with the segmental rack 21 by reason of the location of the beveled pinion 17 adjacent the bracket 15 and a collar 23 secured to the shaft 16 by means of a suitable fastening 24.

A truss brace A of substantially V-shape co-acts with the arm 14 to properly support the same, the minor end 25 of said V-shaped brace embracing the aforesaid shaft 16 and having connections 26 and 27 with the front axle adjacent said knuckle joint 11.

A steering wheel 28 of the vehicle has its post 29 mounted in a suitable bearing 30 supported on an upright 31, rising from the chassis frame 4 and at its lower end the post 29 is connected by a universal joint 32 with a shaft 33 which has a universal joint connection 34 with the aforesaid shaft 16 whereby upon rotation of the steering post 29 the pinion 17 is adapted to rotate therewith, and in the rotation of the latter over the segmental rack 21, the segment 18 is adapted to be moved on its pivot 20. By virtue of pivotal movement of the segment 18 on its pivot 20 and the connection of the segment with the connecting rod 13, the arms 12 of the knuckle joints 11 are shifted according to the direction of rotation of the steering post 29 and the axle spindles 10 shifted on the joints 11 to steer the vehicle, as should be well understood.

The steering mechanism herein described, is particularly adapted for tractors having a relatively short wheel base in order to provide for quick and short turns of the tractor. As premised in the foregoing, however, the steering mechanism herein described, and illustrated, is equally applicable to motor driven vehicles of various types. The structure is simple, strong, durable, efficient and economical.

What I claim is:—

1. In a device of the character described, an axle, a spindle pivoted to each end of the axle on a vertical axis, an arm extending from each spindle, a rod connecting said arms, said axle having a slot intermediate the ends thereof, an arm having connection with the axle and extending rearwardly thereof, a bracket secured to said arm of the axle, a shaft journaled in said bracket, a pinion on said shaft, a segmental shaped member pivoted in the aforesaid slot on the axle, and extending rearwardly under the last mentioned arm and also under and beyond the aforesaid rod, an arcuate shaped rack on said segmental member, in the rear of said rod and meshing with the aforesaid pinion, a connection between the aforesaid connecting rod and the segmental member, and means for rotating said shaft.

2. In a steering device of the character described, an axle, a spindle pivoted to each end of the axle, connections between the spindles, a segmental shaped member connected to the aforesaid connections and pivoted to the axle, and having its inner end extending rearwardly beyond the connection between the spindles, a gear rack on the segmental member in the rear of the connection between the spindles, a rotatable shaft, a pinion on the shaft in mesh with said rack, means for pivoting the segmental member intermediate its ends to said connection between the spindles, and means for rotating said shaft.

3. In a steering device, an axle, a spindle pivoted to each end of the axle on a vertical axis, an arm extending from each spindle, a rod connecting said arms, an arm connected to the axle and extending rearwardly thereof, a bracket secured to the inner end of said last-mentioned arm, a segmental shaped member pivoted to the axle and extending rearwardly under said last arm and under and rearwardly of said rod, an arcuate rack on the segmental member and located normally between said rod and said bracket, means pivotally connecting the segmental member and rod together, a shaft journaled in said bracket, a pinion on the shaft in mesh with said rack, and means whereby the shaft may be rotated.

In testimony whereof I affix my signature.

ARTHUR COLEMAN.

Copies of this patent may be obtained for five cents each, by addressing the "Commissioner of Patents, Washington, D. C."